(12) United States Patent
Kim et al.

(10) Patent No.: US 9,207,936 B2
(45) Date of Patent: Dec. 8, 2015

(54) GRAPHIC PROCESSOR UNIT AND METHOD OF OPERATING THE SAME

(71) Applicant: Samsung Electronics Co., Ltd., Suwon-si (KR)

(72) Inventors: Hyun-Suk Kim, Seoul (KR); Yong-Ha Park, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/466,136

(22) Filed: Aug. 22, 2014

(65) Prior Publication Data

US 2015/0091918 A1    Apr. 2, 2015

(30) Foreign Application Priority Data

Sep. 27, 2013  (KR) .......................... 10-2013-0115399

(51) Int. Cl.
| | |
|---|---|
| *G06F 13/00* | (2006.01) |
| *G06T 1/60* | (2006.01) |
| *G06F 9/30* | (2006.01) |
| *G06F 9/44* | (2006.01) |

(52) U.S. Cl.
CPC .. *G06F 9/30* (2013.01); *G06F 9/44* (2013.01); *G06T 1/60* (2013.01)

(58) Field of Classification Search
None
See application file for complete search history.

(56) References Cited

U.S. PATENT DOCUMENTS

| | | | |
|---|---|---|---|
| 5,799,183 A | 8/1998 | Iwashita | |
| 5,812,147 A * | 9/1998 | Van Hook | G06F 9/30032 345/537 |
| 6,883,067 B2 | 4/2005 | Southwell et al. | |
| 6,966,055 B2 | 11/2005 | Haber et al. | |
| 6,983,467 B2 | 1/2006 | Engstrom et al. | |
| 7,730,463 B2 | 6/2010 | Eichenberger et al. | |
| 8,132,163 B2 | 3/2012 | Tal et al. | |
| 2012/0075319 A1 * | 3/2012 | Dally | G06F 12/0284 345/537 |
| 2012/0254591 A1 | 10/2012 | Hughes et al. | |

* cited by examiner

*Primary Examiner* — Jacinta M Crawford
(74) *Attorney, Agent, or Firm* — Onello & Mello, LLP

(57) ABSTRACT

A method of operating a graphic processor unit includes detecting from a program code a code area that instructs a load/store unit to load data stored in a plurality of rows of a memory to registers of a register file using a scheduler; and, using a load/store unit, loading data to the at least one register in response to instructions corresponding to the code area. A second instruction of the instructions instructs the load/store unit to write control information in a control register of the at least one register. The control information includes at least mask bits designating selected rows of the memory that store data to be loaded from the plurality of rows of the memory, a span field representing a relationship of the plurality of rows of the memory to each other and a stride field. A third instruction of the instruction instructs the load/store unit to store the data sequentially from a row of the memory corresponding to an address written in a base register of the register file to a first register of the register file, according to the control information.

20 Claims, 16 Drawing Sheets

| INSTRUCTION | OPCODE | OPERATION |
|---|---|---|
| nop | 0h | no operation |
| Mov dst,src0 | 1h | dst = srco |
| add dst,src0,src1 | 2h | dst = srco + src1 |
| mul dst,src0,src1 | 3h | dst = srco × src1 |

FIG. 10C

| SOURCE CODE | OPCODE | OBJECT |
|---|---|---|
| Mov r5,r0 | 1h | 411 20000h |
| Ld.8.multiple r0,[rb,rc] | 8h | 850 C7000h |

FIG. 13A

Mov rb, _base_addr ～541
Mov rc, int(0b111101111, span=3, stride=width, dup=4) ～542
Ld.8.multiple.packed r0, [rb, rc] ～543

FIG. 13B

Mov rb, _base_addr ～551
Mov rc, int(0b111101111, span=3, stride=width, dup=4) ～552
Ld.8.multiple r0, [rb, rc] ～553

```
Mov rb, _base_addr ~561
Mov rc, int(0b111101111, span=3, stride=width, dup=1) ~562
Ld.16.multiple.packed r0, [rb, rc] ~563
```

GRAPHIC PROCESSOR UNIT AND METHOD OF OPERATING THE SAME

CROSS-REFERENCE TO RELATED APPLICATION(S)

This U.S. non-provisional patent application claims priority under 35 USC §119 to Korean Patent Application No. 10-2013-0115399, filed on Sep. 27, 2013 in the Korean Intellectual Property Office (KIPO), the contents of which are herein incorporated by reference in their entirety.

BACKGROUND

1. Technical Field

The present inventive concepts relate to a graphic processing field and more particularly to a graphic processor unit and a method of operating the same.

2. Description of the Related Art

Three-dimensional (3D) graphics systems may realistically display moving images using a 3D accelerator. The 3D accelerator may be used to rapidly perform 3D graphic processing through a hardware-implemented graphic arithmetic unit. As various demands are required by users and 3D graphics have become more developed, a programmable processor has been provided in the 3D accelerator. The programmable processor is referred to as a graphic processor unit (GPU) which is different from the conventional central processing unit (CPU).

SUMMARY

Some example embodiments of the present inventive concepts provide a method of operating a GPU which is capable of a reducing time required to execute instructions to enhance performance of the GPU.

Some example embodiments of the present inventive concepts provide a GPU which is capable of reducing a time required to execute instructions to enhance performance of the GPU.

According to an aspect of the present inventive concepts, a method of operating a graphic processor unit includes detecting from a program code a code area that instructs a load/store unit to load data stored in a plurality of rows of a memory to at least one register of a register file, using a scheduler; and loading, using a load/store unit, data to the at least one register of the register file in response to at least one instruction corresponding to the code area. The at least one instruction comprises second and third instructions. The second instruction instructs the load/store unit to write control information in a control register of the at least one register of the register file. The control information includes at least mask bits designating selected rows of the memory that store data to be loaded from the plurality of rows of the memory to the at least one register of the register file, a span field a representing relationship of the plurality of rows of the memory to each other, and a stride field. The third instruction instructs the load/store unit to store the data sequentially from a row of the memory corresponding to an address written in a base register of the at least one register of the register file to a first register of the at least one register of the register file as a starting register, according to the control information.

In some embodiments, data stored in one row may include data associated with one pixel.

In some embodiments, a number of memory transactions between the memory and the register file may be determined based on the control information.

In some embodiments, the at least one instruction may further include a first instruction that instructs to write a base address designating a first row of the plurality of rows of the memory to the base register of the at least one register of the register file. The control information may further include a duplication field that represents a number of the mask bit with respect to data of one pixel.

In some embodiments, when the data stored in one row of the memory corresponds to RGBA data of the one pixel, the duplication field may correspond to four.

In some embodiments, the rows may be divided into a plurality of groups, each of which has consecutive addresses indicated by the span field.

In some embodiments, the stride field may determine an address gap between the groups.

In some embodiments, the third instruction may further include a format field that represents a format of the data to be loaded to the at least one register of the register file.

In some embodiments, when the format field represents that the data to be loaded have a packed format, the data may be packed and the packed data may be stored in the at least one register of the register file according to the mask bit.

In some embodiments, when the format field represents that the data to be loaded have an unpacked format, the data may be stored in the at least one register of the register file according to the span field.

In some embodiments, the third instruction may further include at least one of an article, a number and a physical address of the starting register.

According to another aspect of the present inventive concepts, a graphic processor unit includes an instruction memory, a scheduler, a load/store unit and a register file. The instruction memory stores compiled source code from a host as an instruction. The scheduler decodes an instruction from the instruction memory, and the scheduler is connected to a thread pool that stores a plurality of threads temporarily. The load/store unit calculates a base address designating a first row of a plurality of rows of a memory based on a multiple load instruction, when the decoded instruction from the scheduler is the multiple load instruction that instructs the load/store unit to load data stored in the plurality of rows of the memory. The register file includes at least one register to which the data stored in the memory are loaded based on the base address. The multiple load instruction includes second and third instructions. The second instruction instructs the load/store unit to write control information in a control register of the at least one register of the register file and the control information includes at least mask bits designating selected rows of the memory that store data to be loaded from the plurality of rows of the memory to the at least one register of the register file, a span field representing a relationship of the plurality of rows of the memory to each other and a stride field. The third instruction instructs the load/store unit to store the data sequentially from a row of the memory corresponding to an address written in a base register of the at least one register of the register file to a first register of the at least one register of the register file as a starting register, according to the control information.

In some embodiments, the multiple load instruction may further include a first instruction that instructs the load/store unit to write the base address designating the first row of the plurality of rows of the memory to the base register of the at least one register of the register file. The control information may further include a duplication field that represents a number of the mask bit with respect to data of one pixel.

In some embodiments, the third instruction may further include a format field that represents a format of the data to be loaded to the at least one register of the register file, and, when the format filed represents that the data to be loaded has a packed format, the data are packed and the packed data are stored in the at least one register of the register file according to the mask bit.

In some embodiments, the third instruction may further include a format field that represents a format of the data to be loaded to the at least one register of the register file, and, when the format filed represents that the data to be loaded has a unpacked format, the data are stored in the at least one register of the register file according to the span field.

According to another aspect of the present inventive concepts, a graphic processor unit includes a scheduler receiving and decoding a multiple load instruction, a load/store unit receiving the decoded multiple load instruction from the scheduler, and a register file comprising at least one register to which data stored in a memory are loaded based on a base address. The multiple load instruction instructs the load/store unit to load data stored in a plurality of rows of the memory to the at least one register of the register file. The multiple load instruction comprises first, second and third instructions. The first instruction instructs the load/store unit to write the base address designating a first row of the plurality of rows of the system memory to a base register of the at least one register of the register file. The second instruction instructs the load/store unit to write control information in a control register of the at least one register of the register file, the control information including at least mask bits designating selected rows of the memory that store data to be loaded from the plurality of rows of the memory to the at least one register of the register file, a span field representing a relationship of the plurality of rows of the memory to each other and a stride field. The third instruction instructs the load/store unit to store the data sequentially from a row of the memory corresponding to an address written in the base register of the at least one register of the register file to a first register of the at least one register of the register file as a starting register, according to the control information.

In some embodiments, the graphic processor unit further includes an instruction memory storing compiled source code from a host as an instruction, wherein the scheduler decodes a scheduler decodes an instruction from the instruction memory, and wherein the scheduler being connected to a thread pool that stores a plurality of threads temporarily.

In some embodiments, the control information further includes a duplication field that represents a number of the mask bit with respect to data of one pixel.

In some embodiments, the third instruction further includes a format field that represents a format of the data to be loaded to the at least one register of the register file, and, when the format filed represents that the data to be loaded has a packed format, the data are packed and the packed data are stored in the at least one register of the register file according to the mask bit.

In some embodiments, the third instruction further includes a format field that represents a format of the data to be loaded to the at least one register of the register file, and, when the format filed represents that the data to be loaded has a unpacked format, the data are stored in the at least one register of the register file according to the span field.

Accordingly, since data stored in a memory device is loaded into a register file at one time using a multiple load instruction, a time required for loading data is reduced and, thus, performance of the graphic processor unit may be enhanced.

BRIEF DESCRIPTION OF THE DRAWINGS

The foregoing and other features and advantages of the inventive concepts will be apparent from the more particular description of embodiments of the inventive concepts, as illustrated in the accompanying drawings in which like reference characters refer to the same parts throughout the different views. The drawings are not necessarily to scale, emphasis instead being placed upon illustrating the principles of the inventive concepts.

FIG. 10B illustrates op codes and associated operations of some instructions processed by the GPU of FIG. 2 according to an example embodiment of the present inventive concepts.

FIG. 10C illustrates an instruction of source code and an associated instruction of object code when a compile process is performed in the GPU of FIG. 2 according to an example embodiment of the present inventive concepts.

FIGS. 13A through 13C, respectively, illustrate examples of source codes of the multiple load instruction according to example embodiments of the present inventive concepts.

FIGS. 14A through 14C respectively illustrate examples of the register file when a multiple load instruction is executed by the GPU of FIG. 2 according to example embodiments of the present inventive concepts.

DETAILED DESCRIPTION OF THE EMBODIMENTS

Figure 1:
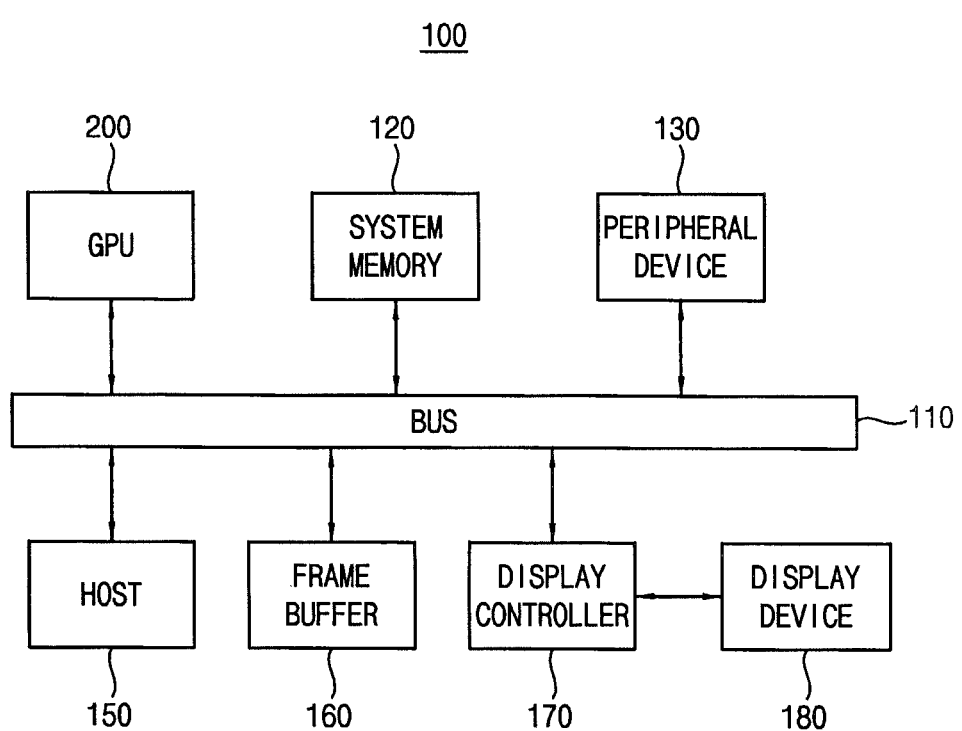
FIG. 1 is a block diagram illustrating a graphic system according to an example embodiment of the present inventive concepts.

Various example embodiments will be described more fully hereinafter with reference to the accompanying drawings, in which some example embodiments are shown. The present inventive concepts may, however, be embodied in many different forms and should not be construed as limited to the embodiments set forth herein. Rather, these embodiments are provided so that this disclosure will be thorough and complete, and will fully convey the scope of the present inventive concept to those skilled in the art. Like reference numerals refer to like elements throughout this application.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer and/or section from another element, component, region, layer and/or section. Thus, a first element, component, region, layer and/or section could be termed a second element, component, region, layer and/or section without departing from the teachings of the present inventive concepts.

It will be understood that when an element is referred to as being "on," "connected to" or "coupled to" another element or layer, it can be directly on, connected or coupled to the other element or layer or intervening elements may be present. In contrast, when an element is referred to as being "directly on," "directly connected to" or "directly coupled to" another element or layer, there are no intervening elements present. Like numerals refer to like elements throughout. As used herein, the term "and/or" includes any and all combinations of one or more of the associated listed items.

The terminology used herein is for the purpose of describing particular example embodiments only and is not intended to be limiting of the inventive concepts. As used herein, the singular forms "a," "an" and "the" are intended to include the plural forms as well, unless the context clearly indicates otherwise. It will be further understood that the terms "comprises," "comprising," "includes" and/or "including," when used in the specification, specify the presence of stated features, integers, steps, operations, elements, and/or components, but do not preclude the presence or addition of one or more other features, integers, steps, operations, elements, components, and/or groups thereof.

Spatially relative terms, such as "beneath," "below," "lower," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present inventive concepts.

FIG. 1 is a block diagram illustrating a graphic system 100 according to an example embodiment of the present inventive concepts.

Referring to FIG. 1, the graphic system 100 includes a graphic processor unit (GPU) 200, a system memory 120, a peripheral device 130, a host 150, a frame buffer 160, a display controller 170 and a display device 180 which are connected to each other through a system bus 110. The GPU 200 performs commands requested by the host 150 and/or the peripheral device 130 using a 3D graphic processing program and/or 3D graphic models/data stored in the system memory 120. Graphics data that are translated by the GPU 200 are stored in the frame buffer 160 and are displayed through the display controller 170 on the display device 180.

The GPU 200 may at one time, that is, simultaneously, load a plurality of data stored in the system memory 120 to a register file (or a plurality of registers) in the GPU 200 using one instruction. In addition, the GPU 200 may store data in the register file to the frame buffer 160 using one instruction. The GPU 200 may use a multiple load/store instruction.

The system memory 120 may be implemented using a Dynamic Random Access Memory (DRAM) such as a Double Data Rate (DDR) Synchronous Dynamic Random Access Memory (SDRAM), a Low Power Double Data Rate (LPDDR) SDRAM, a Graphics Double Data Rate (GDDR) SDRAM, a Rambus Dynamic Random Access Memory (RDRAM) or the like.

The display device 180 may be implemented using one of a liquid crystal display (LCD), a light emitting diode (LED) display, an Organic LED (OLED) display and an active-matrix OLED (AMOLED) display or the like.

Figure 2:
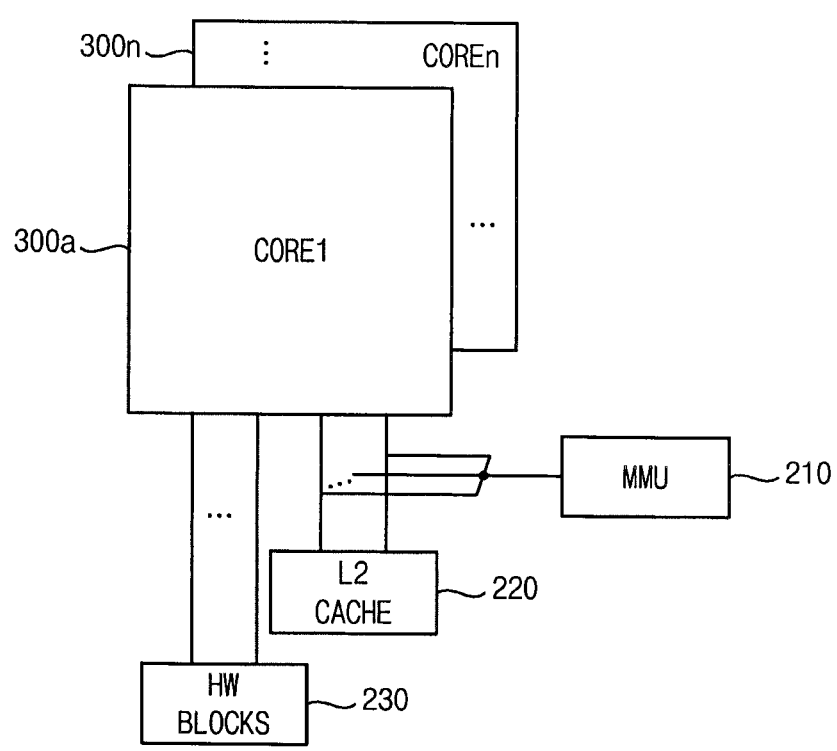
FIG. 2 is a block diagram that illustrates a graphic processor unit (GPU) of FIG. 1 according to an example embodiment of the present inventive concepts.

FIG. 2 is a block diagram that illustrates the GPU 200 of FIG. 1 according to an example embodiment of the present inventive concepts.

Referring to FIG. 2, the GPU 200 includes a plurality of cores 300a~300n, a memory management unit (MMU) 210, a cache memory 220 and hardware blocks 230.

Each of the cores 300a~300n generates graphics data by, in parallel or individually, processing a 3D graphics model stored in the system memory 120. The 3D graphics model stored in the system memory 120 is transferred to the GPU 200 through the system bus 110 and the peripheral device 130. The MMU 210 stores the generated graphics data in the frame buffer 160. The cache memory 220 stores data that is frequently used when the cores 300a~300n process the 3D graphics models. The hardware blocks 230 may process the 3D graphics models under the control of the cores 300a~300n.

Each of the cores 300a~300n is selectively activated according to a number of cores that are required for processing threads in a process of the GPU 200. The selectively activated cores 300a~300n process the 3D graphics models to generate 3D graphics data.

Figure 3:
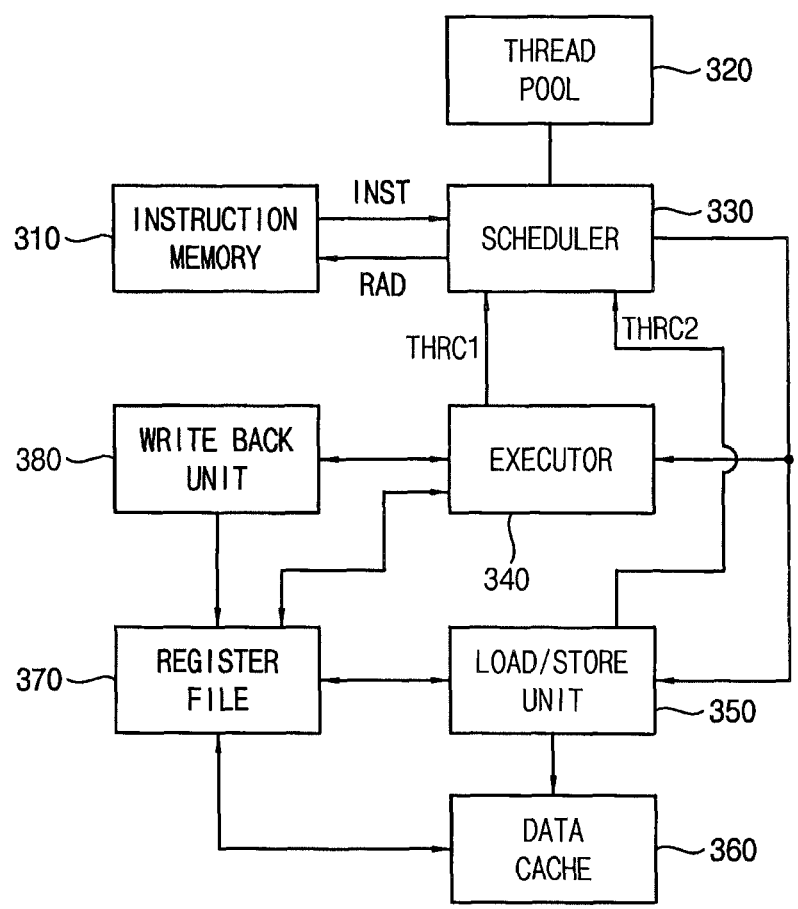
FIG. 3 is a block diagram illustrating a core of FIG. 2 according to an example embodiment of the present inventive concepts.

FIG. 3 is a block diagram illustrating one of the cores 300*a* of FIG. 2 according to an example embodiment of the present inventive concepts.

Referring to FIG. 3, the core 300*a* includes an instruction memory 310, a thread pool 320, a scheduler 330, an executor 340, a load/store unit 350, a data cache 360, a register file 370 and a write back unit 380.

Source code is compiled into an object code and the object code is stored in the instruction memory 310 as binary data. One instruction of the object code is stored in one row of the instruction memory 310. The instruction memory 310 may store compiled instructions at the request of the host 150. The compiled instruction may include an op code field specifying a type of an operator, a source address field specifying a source address of an operand and a destination address field specifying a destination address of an operation result.

The thread pool 320 temporarily stores a plurality of threads which constitute one process. The scheduler 330 outputs a row address RAD that specifies an address designating a location of an instruction associated with a thread that is currently being processed. The instruction memory 310 may provide the scheduler 330 with the instruction INST, sequentially or unsequentially, by branch command, in response to the row address RAD.

The scheduler 330 decodes the op code of the instruction INST, determines the type of the instruction INST and provides the decoded instruction to the executor 340 or the load/store unit 350. The load/store unit 350 loads data stored in the system memory 120 and provided on bus 110 to the register file 370 and stores result data loaded to the register file 370 in the frame buffer 160 according to the decoded instruction by providing the result data on bus 110.

The executor 340 retrieves an operand stored in a corresponding address of the register file 370 in response to an operand address of the decoded instruction, executes the instruction by using the type of the decoded instruction and the retrieved operand, and provides result data to the write back unit 380. The write back unit 380 stores operation result in an address of the register file 370, which corresponds to a destination address of the instruction.

When the decoded instruction from the scheduler 330 is a multiple load instruction that instructs the load/store unit 350 to load data stored in a plurality of rows of the system memory 120 into the register file 370, the load/store unit 350 calculates a base address of the system memory 120, which is stored in the source address field of the instruction and loads the data stored in some areas of the system memory 120 to at least one register of the register file 370. The multiple load instruction may include first through third instructions. The first instruction may instruct the load/store unit 350 to write a base address designating a first row of the plurality of rows of the system memory 120 to the base register of the at least one register of the register file 370. The second instruction may instruct the load/store unit 350 to write control information in a control register of the at least one register of the register file 370. The control information may include at least mask bits designating selected rows of the system memory 120 that store data to be loaded from the plurality of rows of the system memory 120 to the at least one register of the register file 370, a span field representing a relationship of the rows of the system memory 120 to each other, and a stride field. The third instruction may instruct the load/store unit 350 to store the data, sequentially, from a row of the system memory 120 corresponding to an address written in the base register of the register file 370 to a first register of the register file 370 as a starting register, according to the control information.

When the decoded instruction from the scheduler 330 is a multiple store instruction that instructs the load/store unit 350 to store data from the register file 370 into the frame buffer 160, the load/store unit 350 calculates a base address designating a first row of a plurality of rows of the frame buffer 160, which is stored in the destination address field of the instruction and stores the data from the register file 370 to some areas of the frame buffer 160. The load/store unit 350 calculates the base address of the frame buffer 160 using the mask bits, the span field and the stride field.

When processing of the current thread is complete, the executer 340 notifies the scheduler 330 that the current thread is complete by providing a first thread completion signal THRC1 to the scheduler 330. When a read operation of the system memory 120 corresponding to the multiple load instruction 120 is complete, the load/store unit 350 notifies the scheduler 330 that the read operation is complete by providing a second thread completion signal THRC2 to the scheduler 330. When the scheduler 330 receives the first and second thread completion signals THRC1 and THRC2 from the executer 340 and the load/store unit 350, respectively, the scheduler 230 may fetch a next instruction of the corresponding next thread.

The data cache 360 may temporarily store data that are loaded from the system memory 120. The data that are temporarily stored in the data cache 360 may be loaded to a register of the register file 370, which corresponds to an address stored in the destination address field of the compiled instruction.

Figure 4:
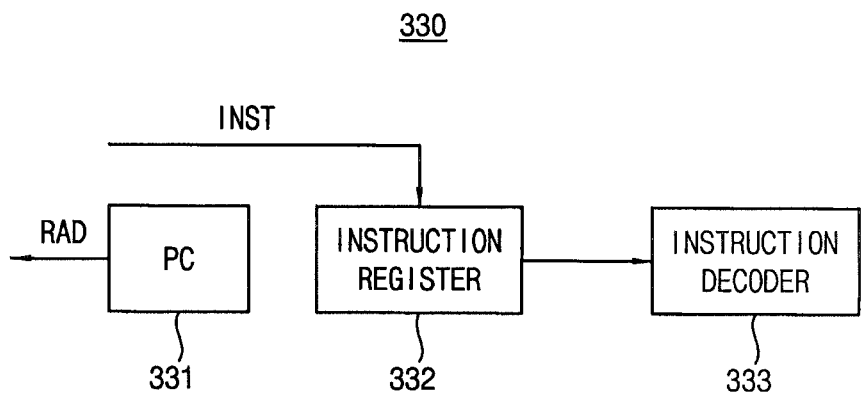
FIG. 4 is a block diagram illustrating a scheduler of FIG. 3 according to an example embodiment of the present inventive concepts.

FIG. 4 is a block diagram illustrating the scheduler 330 of FIG. 3 according to an example embodiment of the present inventive concepts.

Referring to FIG. 4, the scheduler 330 includes a program counter 331, an instruction register 332 and an instruction decoder 333.

The program counter 331 generates the row address signal RAD specifying an address of an instruction stored in the instruction memory 310, and the instruction memory 310 outputs the instruction INST to the instruction register 332 in response to the row address signal RAD. The instruction decoder 333 decodes the op code of the instruction received from the instruction register 332 to determine a type of the instruction INST. The instruction decoder 333 may provide the instruction to the executor 340 or the load/store unit 350 according to the type of the decoded instruction.

For example, when the type of the decoded instruction is determined to be a multiple load/store instruction, the instruction decoder 333 may provide the instruction to the load/store unit 350. For example, when the type of the decoded instruction is determined not to be the multiple load/store instruction, the instruction decoder 333 may provide the instruction to the executor 340.

Figure 5:
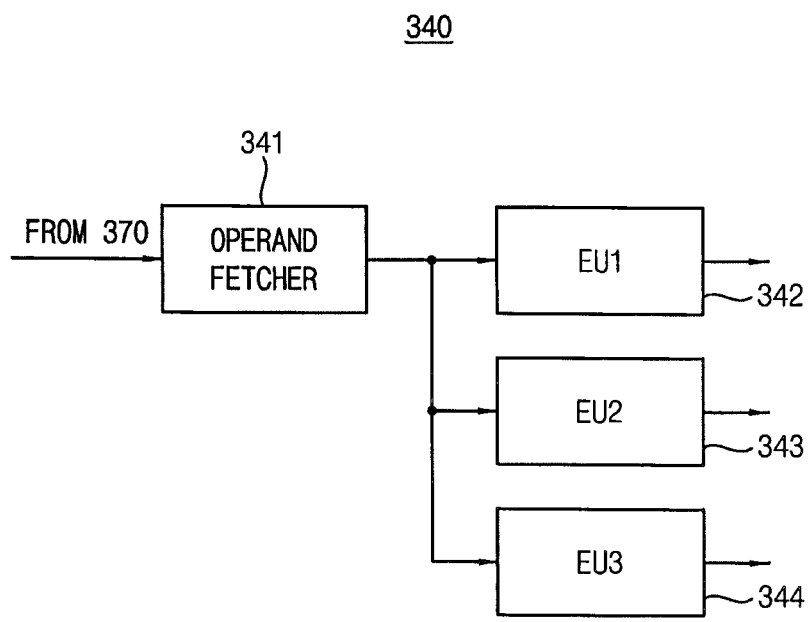
FIG. 5 is a block diagram illustrating an executor of FIG. 3 according to an example embodiment of the present inventive concepts.

FIG. 5 is a block diagram illustrating the executor 340 of FIG. 3 according to an example embodiment of the present inventive concepts.

Referring to FIG. 5, the executor 340 includes an operand fetcher 341 and a plurality of execution units 342, 343 and 344. The operand fetcher 341 fetches an operand stored in a register of the register file 370, which is designated by an address corresponding to the operand address of the instruction from the scheduler 330. Each of the execution units 342, 343 and 344 executes the instruction from the scheduler 330 using the type of the decoded instruction and the fetched operand to provide the execution result to the write back unit 380. The write back unit 380 may store the execution result in an address of the register file 370 which corresponds to the destination of the instruction from the scheduler 330.

Each of the execution units 342, 343 and 344 may include integer execution units, floating-point execution units and branch executions; however, the present inventive concepts are not limited thereto.

In some example embodiments, a series of processes such as an instruction fetching, an instruction decoding and an instruction execution may be performed in a pipe-lined manner, and, thus, execution speed of the graphic processor unit 200 may be increased.

Figure 6:
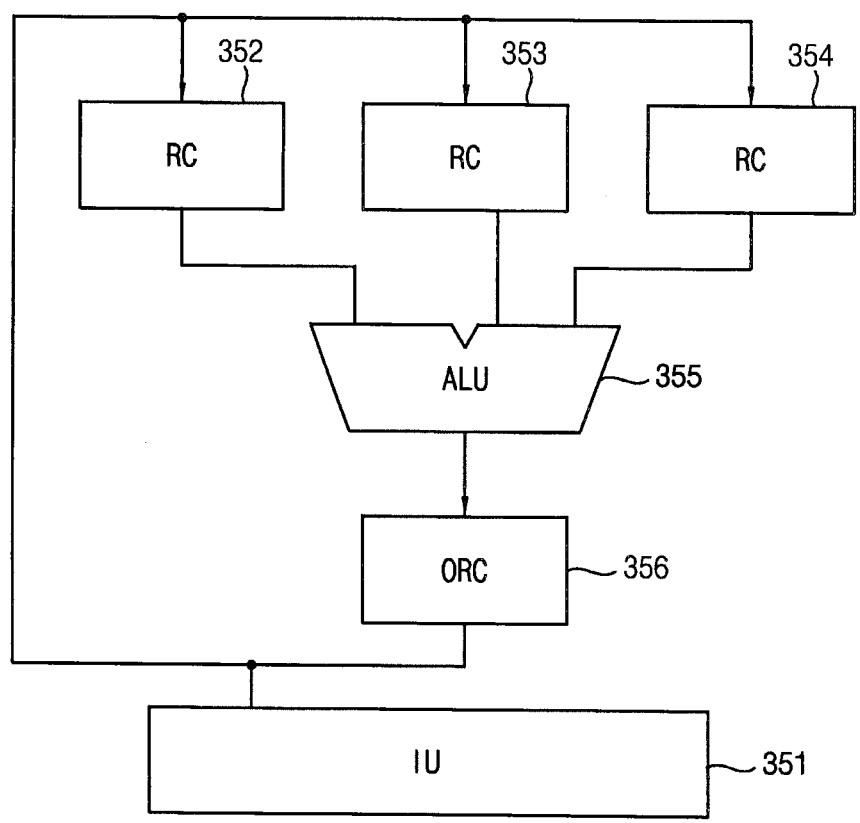
FIG. 6 is a block diagram illustrating a load/store unit of FIG. 3 according to an example embodiment of the present inventive concepts.

FIG. 6 is a block diagram illustrating the load/store unit 350 of FIG. 3 according to an example embodiment of the present inventive concepts.

Referring to FIG. 6, the load/store unit 350 may include an interface unit 351, a plurality of register circuits 352, 353 and 354, an arithmetic logic unit 355 and an output register circuit 356.

The load/store unit 350 may communicate with the scheduler 330, the register file 370, the data cache 360, the system memory 120 and the frame buffer 160.

The interface unit 351 fetches the operand stored in a register of the register file 370 which is designated by an address corresponding to the operand address of the instruction from the scheduler 330. The interface unit 351 provides the operand to the register circuits 352, 353 and 354. The arithmetic logic unit 355 performs an arithmetic logic operation on the operands using the register circuits 352, 353 and 354 and performs a memory loading operation based on the operation result. After performing the memory loading operation, the arithmetic logic unit 355 provides the operation result to the output register circuit 356. When the instruction from the instruction decoder 333 of the scheduler 330 is a multiple load instruction, the load/store unit 350 calculates the base address designating a first row of a plurality of rows of the system memory 120, which is stored in the source address field of the instruction from the instruction decoder 333 of the scheduler 330, reads the data stored in some areas of the system memory 120 and loads the read data to at least one register of the register file 370. The address of the at least one register of the register file 370 is stored in the destination address field of the instruction from the instruction decoder 333 of the scheduler 330.

In addition, when the decoded instruction from the instruction decoder 333 of the scheduler 330 is the multiple store instruction, the load/store unit 350 calculates the base address designating a first row of a plurality of rows of the frame buffer 160, which is stored in the destination address field of the instruction from the instruction decoder 333 of the scheduler 330, reads the data from the register file 370 and stores the read data to some areas of the frame buffer 160 at one time. The address of the frame buffer 160 to which the read data is stored in a destination address field of the instruction from the instruction decoder 330 of the scheduler 330.

Figure 7:
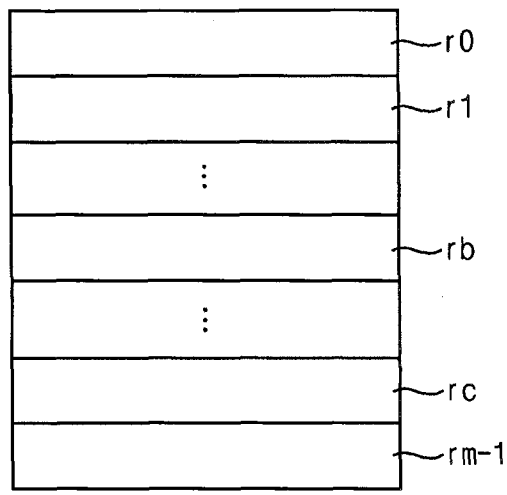
FIG. 7 illustrates an example of a register file of FIG. 3 according to an example embodiment of the present inventive concepts.

FIG. 7 illustrates an example of the register file 370 in FIG. 3 according to an example embodiment of the present inventive concepts.

Referring to FIG. 7, the register file 370 may include a plurality of registers r0~rm-1. Each of the registers r0~rm-1 may store data having a same number of bits with respect to each other. The registers r0~rm-1 may include a base register rb in which the base address designating a row of a plurality of rows of the system memory 120 is written, each of which stores data, according to the first instruction of the multiple load/store instruction. In addition, the registers r0~rm-1 may include a control register rc in which the control information from the multiple load/store instruction is written and the control information includes at least the mask bits designating selected rows of the memory system 120 that store data to be loaded from the plurality of rows of the memory system 20 to the at least one register of the register file 370, the span field representing a relationship of the plurality of rows of the system memory 120 to each other and the stride field. In addition, the data from the system memory 120 may be sequentially loaded into the register file 370, starting with the first register r0 as the starting register, according to the third instruction.

When the load/store unit 350 executes the multiple load instruction, the destination address field of the multiple load instruction may include a number, an article or a physical address of at least one of the registers r0~rm-1. When the destination address field of the multiple load instruction includes the number or the article of at least one of the registers r0~rm-1, a decoder may be needed for the load/store unit 350 to access a corresponding register of the number or article of the at least one of the registers r0~rm-1. When the destination address field of the multiple load instruction includes the physical address of at least one of the registers r0~rm-1, the load/store unit 350 may directly access a corresponding register of the physical address.

Figure 8A:
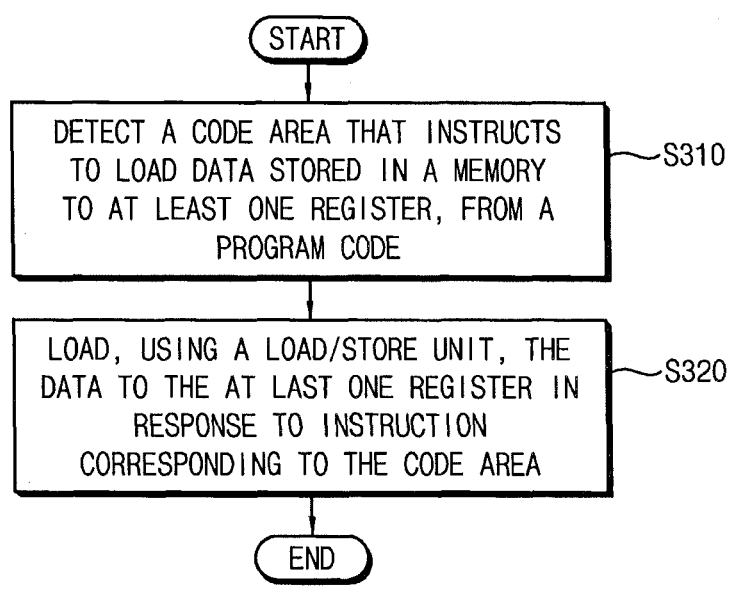
FIG. 8A is a flow chart illustrating a method of operating a graphic processor unit according to an example embodiment of the present inventive concepts.

FIG. 8A is a flow chart illustrating a method of operating a GPU according to an example embodiment of the present inventive concepts.

Referring to FIGS. 1, 3 and 8A, a code area is detected from a program code (or source code), which instructs the load/store unit 350 of the GPU 200 to load data stored in a plurality of rows of the system memory 120 to at least one register of the register file 370 of the GPU 200 (S310). For example, a compiler may detect an area corresponding to a multiple load instruction from the program code. The area corresponding to the multiple load instruction may be a code area that instructs the load/store unit 350 to successively load 8 pixel data stored in the system memory 120, starting from the base address designating a first row of a plurality of rows of the system memory 120, to registers of the register file 370, starting from the starting register, for example, register r0. The load/store unit 350 sequentially loads the pixel data stored in the memory to the at least one register of the register file 370, starting from the starting register, for example, register r0 (S320). In this embodiment, the multiple load instruction may include first through third instructions. The first instruction may instruct the load/store unit 350 to write the base address designating a first row of the plurality of rows of the system memory 120 to the base register rb of the at least one register of the register file 370. The second instruction may instruct the load/store unit 350 to write the control information in the control register rc of the at least one register of the register file 370 and the control information includes at least mask bits designating selected rows of the plurality of rows of the system memory 120 that store data to be loaded from the plurality of rows of the system memory 120 to the at least one register of the register file 370, a span field representing a relationship of the rows of the system memory 120 to each other, and a stride field. The third instruction may instruct the load/store unit 350 to store the data sequentially from a row corresponding to an address written in the base register, for example, register rb, to a first register, for example register r0, as a starting register, according to the control information. The destination address field of the multiple load instruction may include a number, an article or a physical address of at least one of the registers r0~rm-1.

The control information may further include a duplication field that represents a number of the mask bits with respect to data of one pixel. The number of memory transactions between the system memory 120 and the register file 370 may be determined based on the control information. When the format field indicates that the data to be loaded has a packed format, the data are packed and the packed data are stored in the at least one register of the register file 370 according to the mask bit. When the format field indicates that the data to be loaded has an unpacked format, the data are stored in the at least one register of the register file 370 according to the span field.

Figure 8B:
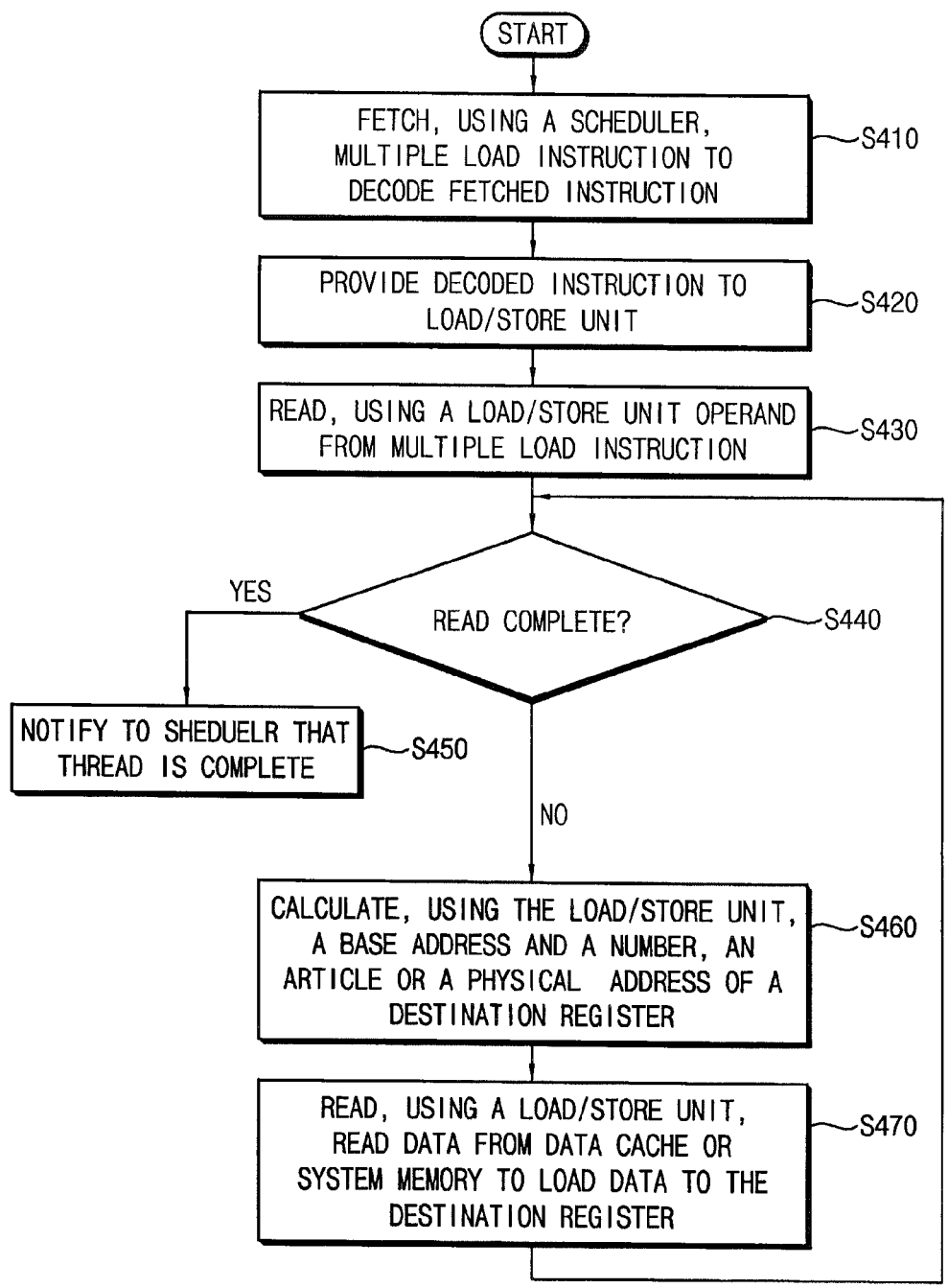
FIG. 8B is a flow chart illustrating a method of operating a graphic processor unit according to an example embodiment of the present inventive concepts.

FIG. 8B is a flow chart illustrating a method of operating a GPU according to an example embodiment of the present inventive concepts.

Referring to FIGS. 1 through 7, and 8B, the scheduler 330 fetches the instruction from the instruction memory 310 and decodes the fetched instruction (S410). When the decoded instruction is the multiple load instruction, the scheduler 330 provides the multiple load instruction to the load/store unit (S420). The load/store unit 370 reads the operand from the operand field of the multiple load instruction (S430). When the operand is not read from the operand filed of the multiple load instruction (YES in S440), the load/store unit 350 may notify the scheduler 330 of the thread completion by providing a second thread completion signal THRC2 to the scheduler 330 (S450). When the operand is read from the operand field of the multiple load instruction (NO in S440), the load/store unit 350 calculates the base address designating a first row of the plurality of rows of the system memory 120 that stores data (or address of the data cache 360) and a number, an article or a physical address of the destination register of the register file 370, for example, the starting register to which the data is to be loaded based on the address of the operand (S460). The load/store unit 350 reads data stored in the data cache 360 or the system memory 120 based on the base address of the system memory 120 and sequentially loads the read data to the registers of the register file 370, starting from the destination register, for example, the starting register (S470). When the loading of the data is complete, the method returns to the step (S440).

In this embodiment, the number of memory transactions between the system memory 120 and the register file 370 may be determined using information from the mask bits, the span field and the stride field. When the memory transactions are complete and all data stored in the system memory 120 are loaded to the register file 370, the load/store unit 370 notifies the scheduler 330 of the completion of the instruction, for example by providing a second thread completion signal THRC2 to the scheduler 330.

Figure 9:
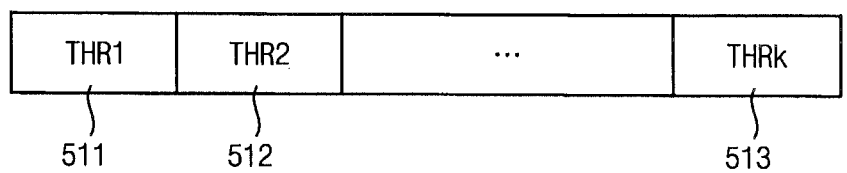
FIG. 9 illustrates a process which is processed in the graphic processor unit of FIG. 2 according to an example embodiment of the present inventive concepts.

FIG. 9 illustrates a process that is processed in the GPU of FIG. 2 according to an example embodiment of the present inventive concepts.

Referring to FIG. 9, a process that is processed in the GPU 200 includes a plurality of threads 511, 512 and 513. The threads 511, 512 and 513 are stored in the thread pool 320 of FIG. 3, and the threads 511, 512 and 513 are sequentially or simultaneously processed in the graphic processor unit 200.

Figure 10A:
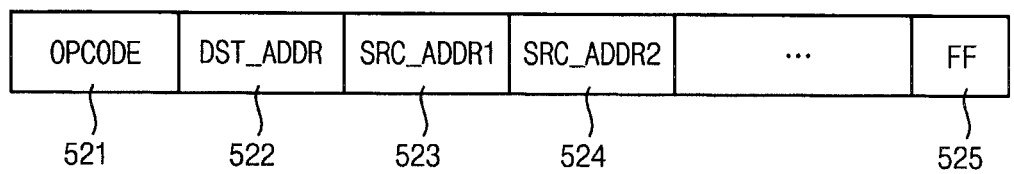
FIG. 10A illustrates an instruction processed by the GPU of FIG. 2 according to an example embodiment of the present inventive concepts.

FIG. 10A illustrates an instruction processed by the GPU 200 according to an example embodiment of the present inventive concepts.

Referring to FIG. 10A, an instruction 520 indicating that a source stored in the instruction memory 310 is compiled, may include an op code field 521 which specifies the type of instruction and the structure of the data on which the instruction operates. The instruction may further include parameters for instruction operation, such as source address fields of an operand 523 and 524 and a destination address field of an operation result 522. When the instruction 520 is the multiple load instruction, the instruction 520 may further include a format flag field 525 which specifies the format of the data to be loaded. The instruction fields 521~525 are created during the compile process and are stored in memory blocks as required by the instruction. The instruction memory 310 may be a cache memory or a SRAM.

FIG. 10B illustrates op codes and associated operations of some instructions processed by the GPU of FIG. 2 according to an example embodiment of the present inventive concepts.

FIG. 10C illustrates an instruction of source code and an associated instruction of object code when a compile process is performed by the GPU of FIG. 2 according to an example embodiment of the present inventive concepts.

Referring to FIGS. 10B and 10C, it is noted that an instruction Mov and an instruction Ld.multiple are successively used for executing the multiple load instruction.

Figure 11A:
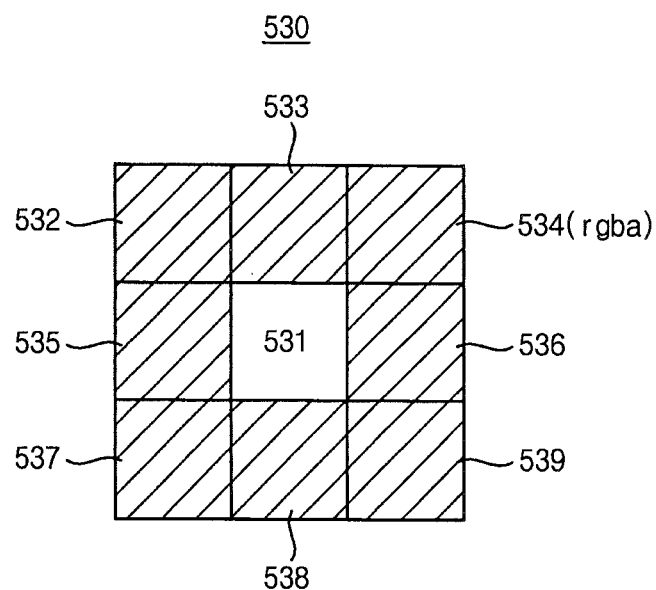
FIGS. 11A and 11B respectively illustrate a portion of a graphics model processed in the GPU of FIG. 2 according to an example embodiment of the present inventive concepts.
Figure 11B:
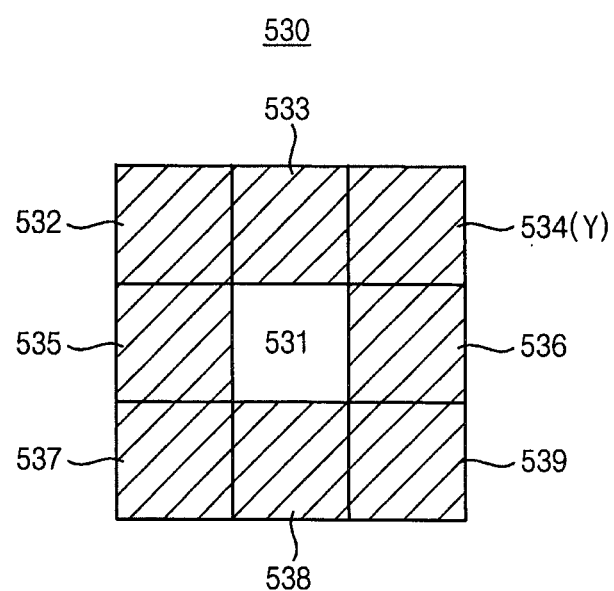

FIGS. 11A and 11B, respectively, illustrate a portion of a graphics model processed in the GPU 200 according to an example embodiment of the present inventive concepts.

Referring to FIGS. 11A and 11B, a portion 530 of a graphics model that is stored in the system memory 120 may include a center pixel 531 and a plurality of neighboring pixels 532~539 surrounding the center pixel 531.

FIG. 11A illustrates that an edge of the center pixel 531 is detected using each RGBA color data of the neighboring pixels 532~539, and FIG. 11B illustrates that an edge of the center pixel 531 is detected using each luminance data of the neighboring pixels 532~539. That is, FIGS. 11A and 11B, illustrates that the color data or the luminance data of the neighboring pixels 532~539 are loaded to the at least one register of the register file 370 in response to the multiple load instruction.

Figure 12:
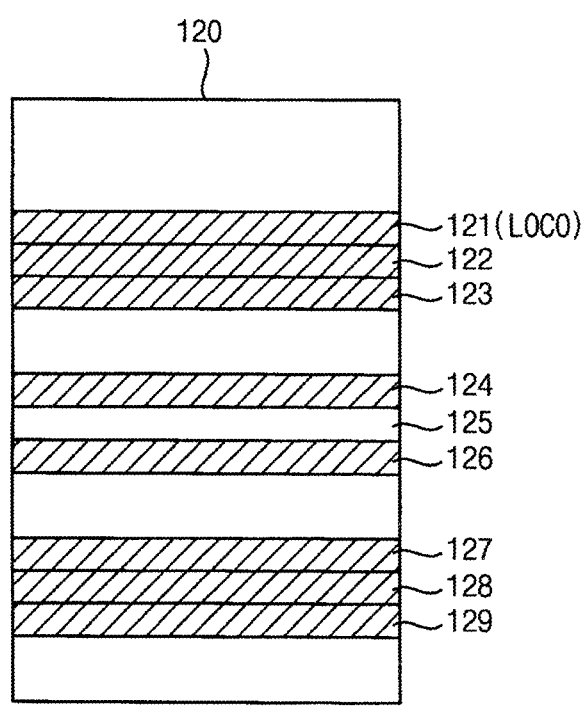
FIG. 12 illustrates address space of a system memory of FIG. 1 according to an example embodiment of the present inventive concepts.

FIG. 12 illustrates address space of the system memory 120 of FIG. 1 according to an example embodiment of the present inventive concepts.

Referring to FIG. 12, the portion 530 of the graphics models of FIGS. 11A and 11B may be stored in the system memory 120, starting from an area corresponding to the base address LOC0 of the system memory 120.

Figures 13C, 14A:
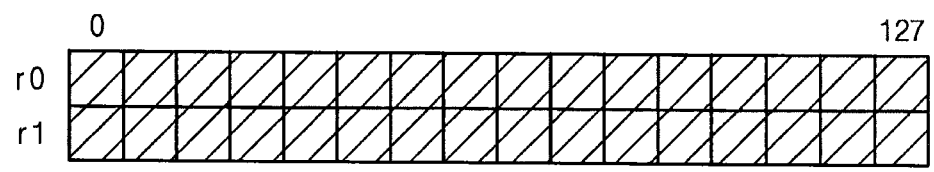

FIGS. 13A through 13C, respectively, illustrate examples of source codes of the multiple load instruction according to example embodiments of the present inventive concepts.

FIG. 13A illustrates a source code of the multiple load instruction that instructs the load/store unit 350 of the GPU 200 to load the RGBA color data of the neighboring pixels 532~539, which are stored in the system memory 120, to the register file 370 of the GPU 200 with a packed format.

FIG. 13B illustrates a source code of the multiple load instruction that instructs the load/store unit 350 of the GPU 200 to load the RGBA color data of the neighboring pixels 532~539, which are stored in the system memory 120, to the register file 370 of the GPU 200 with an unpacked format.

FIG. 13C illustrates a source code of the multiple load instruction that instructs the load/store unit 350 of the GPU 200 to load the luminance data of the neighboring pixels 532~539, which are stored in the system memory 120, to the register file 370 of the GPU 200 with a packed format.

In FIGS. 13A through 13C, rb denotes a base register in the register file 370, re denotes a control register in the register file 370, _base_addr denotes a base address of the system memory 120, each of reference numerals 541, 551 and 561 denotes the first instruction, each of reference numerals 542, 552 and 562 denotes the second instruction and each of reference numerals 543, 553 and 563 denotes the third instruction.

Referring to FIGS. 13A-13C, the first instruction 541, 551 and 561 instructs the load/store unit 350 to write the base address _base_addr specifying the first row of the rows of the system memory 120 in the base register rb of the register file 370. The second instruction 542, 552 and 562 instructs the load/store unit 350 to write the control information int( ) including the mask bit (0b111101111), the span field span, the stride field stride and the duplication field dup into the control register rc in the register file 370. The third instruction 543, 553 and 563 instructs the load/store unit 350 to sequentially load data from a row of the system memory 120 corresponding to the address of the base register to the register file 370, starting from the first register r0, which is the starting register. In addition, the third instruction 543, 553 and 563 may further include a format field such as 'packed', as in FIGS. 13A and 13C, representing the format of the data to be loaded to the register file 370 and a type field such as '8,' as in FIGS. 13A and 13B, or '16,' as in FIG. 13C, representing the type of the data.

Referring again to FIG. 12, the system memory 120 includes a plurality of rows 121~129 that store RGBA color data or the luminance data of the pixels of FIG. 11A or FIG. 11B. Data of the pixel 532 is stored in the row 121, data of the pixel 532 is stored in the row 122, data of the pixel 533 is stored in the row 123, data of the pixel 534 is stored in the row 124, data of the pixel 535 is stored in the row 126, data of the pixel 536 is stored in the row 127, data of the pixel 537 is stored in the row 128, data of the pixel 538 is stored in the row 129, and data of the center pixel 531 is stored in the row 125.

The mask bit '0b111101111' of the second instruction 542, 552, and 562 may specify selected rows 121~124 and 126~129 of the rows 121~129 of the system memory 120, which store data to be loaded from the memory system 120 to the register file 370. The span field 'span' of the second instruction 542, 552 and 562 may represent a relationship of the rows 121~129 of the system memory 120 to each other. That is, the span field 'span' specifies a number of consecutive rows of the rows 121~429 in a row direction. The rows 121~129 may be divided into a plurality of groups by the span field, each of which has consecutive addresses. That is, a first group includes the rows 121~123, each of which stores each data of the pixels 532~534, a second group includes the rows 124~426, each of which stores each data of the pixels 535,531 and 536, and a third group includes the rows 127~129, each of which stores each data of the pixels 537~539. The stride field 'stride' of the second instruction 542, 552 and 562 may determine an address gap between the first and third groups. That is, addresses of the rows 124 and 127 may be calculated from the base address by the stride field 'stride' of the second instruction 542, 552, and 562. The duplication field 'dup' of the second instruction 542, 552 and 562 may denote a number of copies of the mask bit '0b111101111' with respect to one pixel data. When the pixel data is RGBA color data, as in the second instructions 542 and 552 of FIGS. 13A and 13B, the duplication field 'dup' may be set as '4', the mask bits are not required to be allocated to each of RGBA, and, thus, the number of the mask bits may be reduced. In addition, when the pixel data is the luminance data, as in the second instruction 562 of FIG. 13C, the duplication field 'dup' may be set as '1.'

Figure 14B:
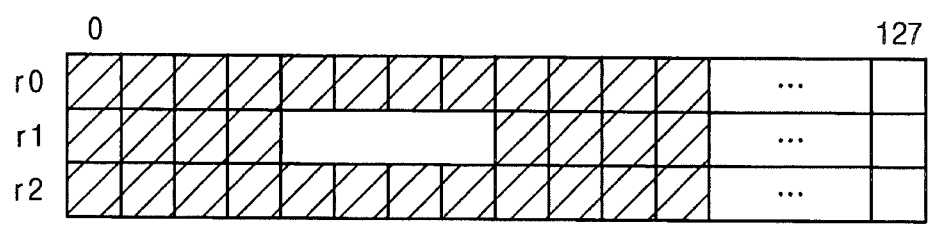
Figure 14C:
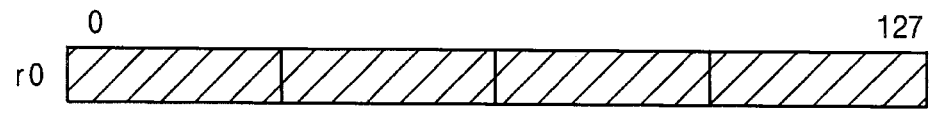

FIGS. 14A through 14C, respectively, illustrate examples of the register file when the multiple load instruction is executed according to an example embodiment of the present inventive concepts.

FIG. 14A illustrates that RGBA color data of the neighboring pixels 532~539, which are stored in the system memory 120, are loaded to the register file 370 with a packed format according to the source code of FIG. 13A.

FIG. 14B illustrates that RGBA color data of the neighboring pixels 532~539, which are stored in the system memory 120, are loaded to the register file 370 with an unpacked format according to the source code of FIG. 13B.

FIG. 14C illustrates that the luminance data of the neighboring pixels 532~539, which are stored in the system memory 120, are loaded to the register file 370 with a packed format according to the source code of FIG. 13C.

Referring to FIGS. 10A, 11A, 12, 13A and 14A, when the RGBA color data of the neighboring pixels 532~539, which are stored in the system memory 120, are loaded to the register file 370 with the packed format according to the instructions 541~543, 256-bit RGBA color data are sequentially loaded to the first and second registers r0 and r1 because each of the neighboring pixels 532~539 includes 32-bit RGBA color data. In this embodiment, the op code field 521 in the instruction 520 of FIG. 10A specifies the multiple load instruction, the destination address field 522 stores the number, the article or the physical address of the first register r0 and the operand address field 523 specifies the base address _base_addr of the row LOC0 of the system memory 120 or an address of another register that stores the base address _base_addr. In addition, since the data has a packed format, a format flag FF with a high level is stored in the format flag field 525.

Referring to FIGS. 10A, 11A, 12, 13B and 14B, when the RGBA color data of the neighboring pixels 532~539, which are stored in the system memory 120, are loaded to the register file 370 with the unpacked format according to the instructions 551~553, 256-bit RGBA color data are loaded to the first through third registers r0, r1 and r2 according to the span field because each of the neighboring pixels 532~539 includes 32-bit RGBA color data. In this embodiment, portion of the second register r1 does not store data because the mask bit of the center pixel 531 is '0'. In addition, the op code field 521 in the instruction 520 of FIG. 10A specifies the multiple load instruction, the destination address field 522 stores the number, the article or the physical address of the first register r0, the operand address field 523 specifies the base address _base_addr of the row LOC0 of the system memory 120 or an address of another register that stores the base address _base_addr. In addition, since the data has an unpacked format, the format flag FF with a low level is stored in the format flag field 525.

Referring to FIGS. 10A, 11B, 12, 13C and 14C, when the luminance data of the neighboring pixels 532~539, which are stored in the system memory 120, are loaded to the register file 370 with the packed format according to the instructions 561~563, 128-bit luminance data are sequentially loaded to the first register r0 because each of the neighboring pixels 532~539 includes 16-bit luminance data. In this embodiment, the op code field 521 in the instruction 520 of FIG. 10A specifies the multiple load instruction, the destination address field 522 stores the number, the article or the physical address of the first register r0, the operand address field 523 specifies the base address _base_addr of the row LOC0 of the system memory 120 or an address of another register that stores the base address _base_addr. In addition, since the data has a packed format, the format flag FF with a high level is stored in the format flag field 525.

Therefore, according to the GPU 200 and the method of operating the GPU 200 of the present inventive concepts, when the data stored in the plurality of rows of the system memory 120 are loaded into the at least one register of the register file 370, a number of memory load/store instructions may be reduced by using the first through third instructions. The first instruction instructs the load/store unit 350 to write a base address designating a first row of the plurality of rows of the system memory 120 to the base register of the at least one register of the register file 370. The second instruction instructs the load/store unit 350 to write control information into a control register of the at least one register of the register file 370. The control information may include at least mask bits designating selected rows of the system memory 120 that store data to be loaded from the plurality of rows of the system memory 120 to the register file 370, a span field representing a relationship of the rows of the system memory 120 to each other, and a stride field. The third instruction instructs the load/store unit 350 to store the data sequentially from a row of the system memory 120 corresponding to an address written in the base register to a first register as a starting register, according to the control information. Accordingly, since occupation of the pipe-lines by repeated load/store instruction may be reduced and other threads may use the pipe-lines, overall performance of the graphic processor unit may be enhanced. In addition, memory access efficiency may be increased because memory transactions may be coalesced.

Figure 15:
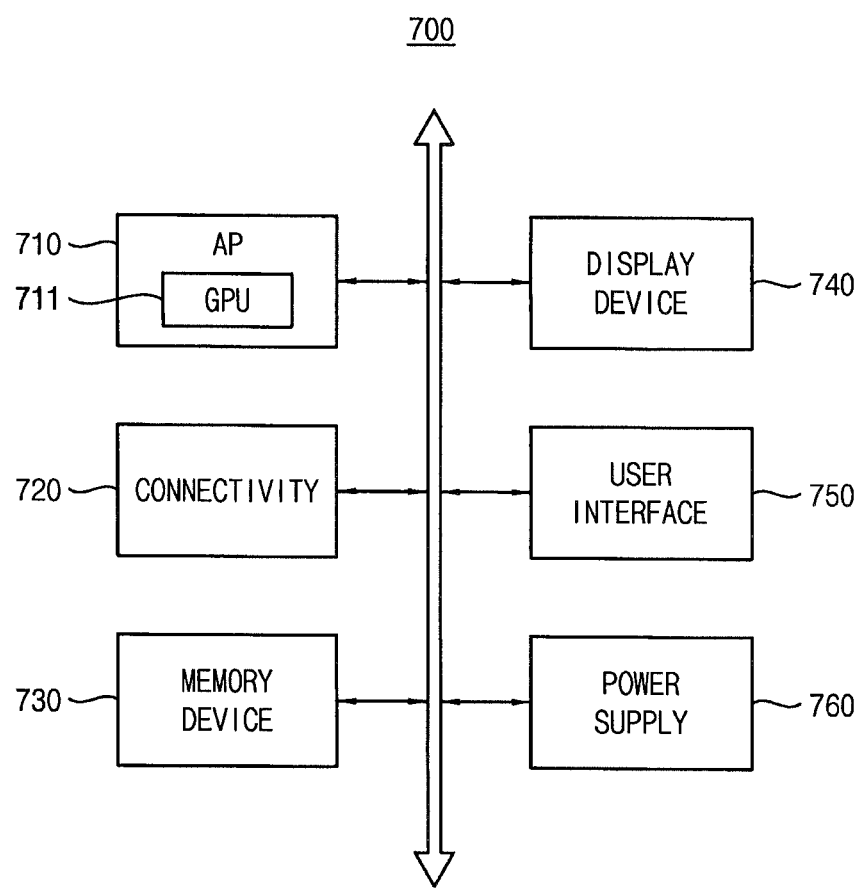
FIG. 15 is a block diagram illustrating a mobile system according to an example embodiment of the present inventive concepts.

FIG. 15 is a block diagram illustrating a mobile system 700 including the GPU 200 of FIG. 2 according to an example embodiment of the present inventive concepts.

Referring to FIG. 15, the mobile system 700 includes an application processor 710, a connectivity unit 720, a memory device 730, a display device 740, a user interface 750 and a power supply 760. In some embodiments, the mobile system 700 may be a mobile phone, a smart phone, a personal digital assistant (PDA), a portable multimedia player (PMP), a digital camera, a music player, a portable game console, a navigation system, or the like.

The application processor 710 may execute applications, such as a web browser, a game application, a video player, or the like. In some embodiments, the application processor 710 may include a single core or multiple cores. For example, the application processor 710 may be a multi-core processor, such as a dual-core processor, a quad-core processor, a hexa-core processor, or the like. The application processor 710 may include an internal or external cache memory. The application processor 710 includes a graphic processor unit (GPU) 711 that processes graphics models to be provided to the display device 740. The GPU 711 may execute a multiple load/store instruction that instructs the GPU 711 to load data stored in the memory device 730 or store data to the memory device 730. The GPU 711 may be substantially the same as the GPU 200 of FIG. 2.

Therefore, when the GPU 711 loads data stored in a plurality of rows of the memory device 730 to the at least one register of a register file of the GPU 711, a number of memory load/store instructions may be reduced by using first through third instructions. The first instruction instructs a load/store unit of the GPU 711 to write a base address designating a first row of the plurality of rows of the memory device 730 to the base register of the at least one register of the register file of the GPU 711. The second instruction instructs the load/store unit of the GPU 711 to write control information into a control register of the at least one register of the register file of the GPU 711 and the control information includes at least mask bits designating selected rows of the memory device 730 that store data to be loaded from the plurality of rows of the memory device 730 to the register file of the GPU 711, a span field representing a relationship of the rows of the memory device 730 to each other, and a stride field. The third instruction instructs the load/store unit of the GPU 711 to store the data sequentially from a row of the memory device 730 corresponding to an address written in the base register of the register file of the GPU 711 to a first register of the register file of the GPU 711 as a starting register, according to the control information. Overall performance of the graphic processor unit may be enhanced because memory access efficiency is increased.

The connectivity unit 720 may perform wired or wireless communication with an external device. For example, the connectivity unit 720 may perform Ethernet communication, near field communication (NFC), radio frequency identification (RFID) communication, mobile telecommunication, memory card communication, universal serial bus (USB) communication, or the like. In some embodiments, connectivity unit 720 may include a baseband chipset that supports communications, such as global system for mobile communications (GSM), general packet radio service (GPRS), wideband code division multiple access (WCDMA), high speed downlink/uplink packet access (HSxPA), or the like.

The memory device 730 may store data processed by the application processor 710, or operate as a working memory. In addition, the memory device 730 may store a boot image for booting the mobile system 700, a file system associated with operating system for driving the mobile system 700, a device driver associated with external devices connected to the mobile device 700 and/or applications running on the mobile system 700. The memory device 700 may be implemented with a Dynamic Random Access Memory (DRAM) such as Double Data Rate (DDR) Synchronous Dynamic Random Access Memory (SDRAM), Low Power Double Data Rate (LPDDR) SDRAM, Graphics Double Data Rate (GDDR) SDRAM, Rambus Dynamic Random Access Memory (RDRAM) or the like. In addition, the memory device 730 may be an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), or the like.

The display device 740 displays graphics data which are generated by the GPU 711 processing the graphics model from the memory device 730.

The user interface 750 may include at least one input device, such as a keypad, a touch screen, or the like, and at least one output device, such as a speaker, a display device, or the like. The power supply 760 may supply a power supply voltage to the mobile system 700. In some embodiments, the mobile system 700 may further include a camera image processor (CIS), and/or a storage device, such as a memory card, a solid state drive (SSD), a hard disk drive (HDD), a CD-ROM, or the like.

In some embodiments, the mobile system 700 and/or components of the mobile system 700 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), wafer-level processed stack package (WSP), or the like.

Figure 16:
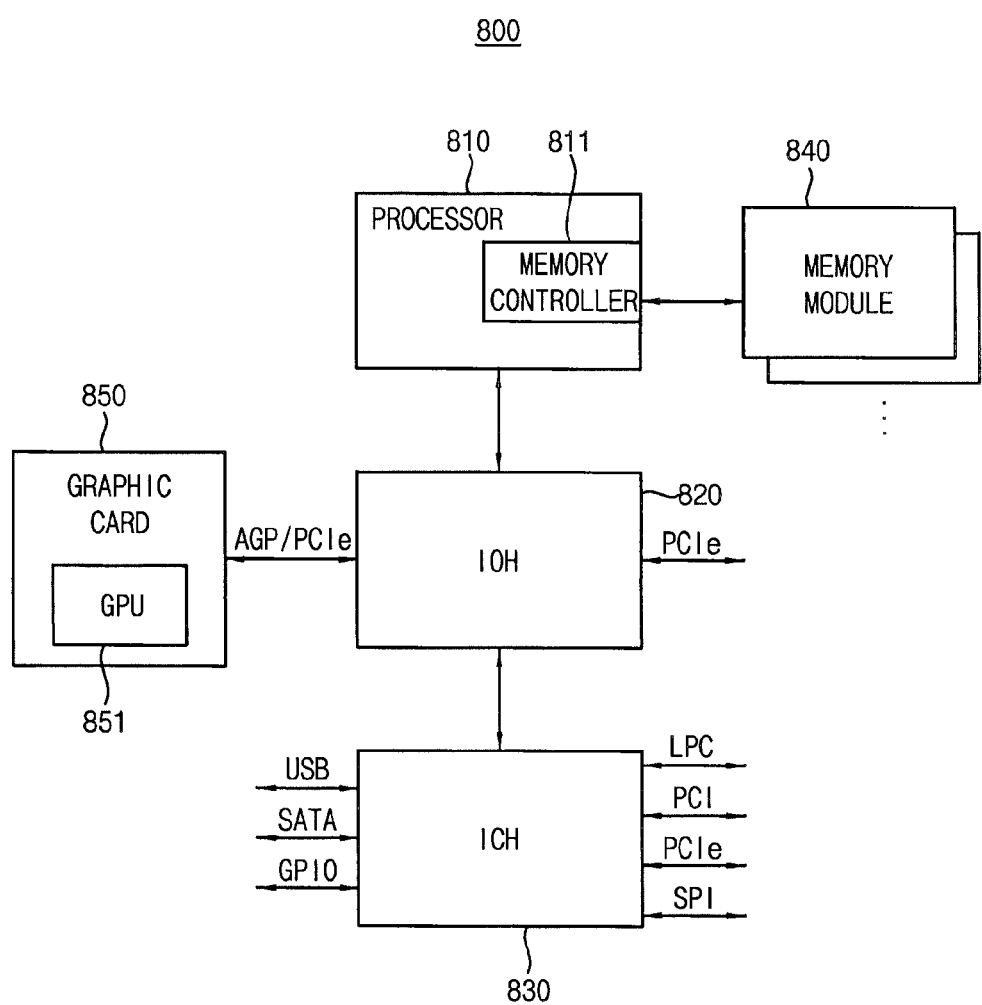
FIG. 16 is a block diagram illustrating a computing system according to an example embodiment of the present inventive concepts.

FIG. 16 is a block diagram illustrating a computing system according to an example embodiment of the present inventive concepts.

Referring to FIG. 16, a computing system 800 includes a processor 810, an input/output hub (IOH) 820, an input/output controller hub (ICH) 830, at least one memory module 840 and a graphics card 850. In some embodiments, the computing system 800 may be a personal computer (PC), a server computer, a workstation, a laptop computer, a mobile phone, a smart phone, a personal digital assistant (PDA), a portable multimedia player (PMP), a digital camera), a digital television, a set-top box, a music player, a portable game console, a navigation system, or the like.

The processor 810 may perform various computing functions, such as executing specific software for performing specific calculations or tasks. For example, the processor 810 may be a microprocessor, a central process unit (CPU), a digital signal processor, or the like. In some embodiments, the processor 810 may include a single core or multiple cores. For example, the processor 810 may be a multi-core processor, such as a dual-core processor, a quad-core processor, a hexa-core processor, or the like. Although FIG. 16 illustrates the computing system 800 including one processor 810, in some embodiments, the computing system 800 may include a plurality of processors. The processor 810 may include an internal or external cache memory.

The processor 810 may include a memory controller 811 for controlling operations of the memory module 840. The memory controller 811 included in the processor 810 may be referred to as an integrated memory controller (IMC). A memory interface between the memory controller 811 and the memory module 840 may be implemented with a single channel including a plurality of signal lines, or may bay be implemented with multiple channels, to each of which at least one memory module 840 may be coupled. In some embodiments, the memory controller 811 may be located inside the input/output hub 820, which may be referred to as memory controller hub (MCH).

The memory module 840 may include a plurality of semiconductor memory devices that store data provided from the memory controller 811. The semiconductor memory devices may store data processed by the application processor 810, or operate as a working memory. In addition, the semiconductor memory devices may store a boot image for booting the computing system 800, a file system associated with operating system for driving the computing system 800, a device driver associated with external devices connected to the computing system 800 and/or applications running on the computing system 800.

The input/output hub 820 may manage data transfer between processor 810 and devices, such as the graphics card 850. The input/output hub 820 may be coupled to the processor 810 via various interfaces. For example, the interface between the processor 810 and the input/output hub 820 may be a front side bus (FSB), a system bus, a HyperTransport, a lightning data transport (LDT), a QuickPath interconnect (QPI), a common system interface (CSI), or the like. Although FIG. 16 illustrates the computing system 800 including one input/output hub 820, in some embodiments, the computing system 800 may include a plurality of input/output hubs. The input/output hub 820 may provide various interfaces with the devices. For example, the input/output hub 820 may provide an accelerated graphics port (AGP) interface, a peripheral component interface-express (PCIe), a communications streaming architecture (CSA) interface, or the like.

The graphics card 850 may be coupled to the input/output hub 820 via AGP or PCIe. The graphics card 850 may control a display device (not shown) for displaying an image. The graphics card 850 may include a GPU 851 for processing image data and an internal semiconductor memory device. The GPU 851 may execute a multiple load/store instruction that instructs a load/store unit of the GPU 851 to load data stored in the semiconductor memory devices or store data to the semiconductor memory devices. The GPU 851 may be substantially the same as the GPU 200 of FIG. 2.

Therefore, when the GPU 851 loads data stored in a plurality of rows of the semiconductor memory devices to at least one register of the register file of the GPU 851, a number of memory load/store instructions may be reduced by using first through third instructions. The first instruction instructs a load/store unit of the GPU 851 to write a base address designating a first row of the plurality of rows of the memory device to the base register of the at least one register of the register file of the GPU 851. The second instruction instructs the load/store unit of the GPU 851 to write control information into a control register of the at least one register of the register file of the GPU 851. The control information includes at least mask bits designating selected rows of the memory device that store data to be loaded from the plurality of rows of the memory device to the register file of the GPU 851, a span field representing a relationship of the rows of the memory device to each other, and a stride field. The third instruction instructs the load/store unit of the GPU 851 to store the data sequentially from a row of the memory device corresponding to an address written in the base register of the register file of the GPU 851 to a first register of the register file of the GPU 851 as a starting register, according to the control information. Overall performance of the GPU 851 may be enhanced because memory access efficiency is increased.

In some embodiments, the input/output hub 820 may include an internal graphics device along with or instead of the graphics card 850 outside the graphics card 850. The graphics device included in the input/output hub 820 may be referred to as integrated graphics. Further, the input/output hub 820 including the internal memory controller and the internal graphics device may be referred to as a graphics and memory controller hub (GMCH).

The input/output controller hub 830 may perform data buffering and interface arbitration to efficiently operate various system interfaces. The input/output controller hub 830 may be coupled to the input/output hub 820 via an internal bus, such as a direct media interface (DMI), a hub interface, an enterprise Southbridge interface (ESI), PCIe, etc. The input/output controller hub 830 may provide various interfaces with peripheral devices. For example, the input/output controller hub 830 may provide a universal serial bus (USB) port, a serial advanced technology attachment (SATA) port, a general purpose input/output (GPIO), a low pin count (LPC) bus, a serial peripheral interface (SPI), PCI, PCIe, or the like.

In some embodiments, the processor 810, the input/output hub 820 and the input/output controller hub 830 may be implemented as separate chipsets or separate integrated circuits. In other embodiments, at least two of the processor 810, the input/output hub 820 and the input/output controller hub 830 may be implemented as a single chipset.

As mentioned above, since the data stored in the memory device are loaded to the register file at one time using the multiple load instruction, time required for loading data is reduced and, thus, performance of the graphic processor unit may be enhanced.

The example embodiments may be applicable to various systems employing a graphic processor unit. The present inventive concept may be applied to systems such as be a mobile phone, a smart phone, a personal digital assistant (PDA), a portable multimedia player (PMP), a digital camera, a music player, a portable game console, a navigation system, or the like.

The foregoing is illustrative of the present inventive concepts and is not to be construed as limiting thereof. Although a few example embodiments have been described, those skilled in the art will readily appreciate that many modifications are possible in the example embodiments without materially departing from the novel teachings and advantages of the present inventive concepts. Accordingly, all such modifications are intended to be included within the scope of the present inventive concepts as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of operating a graphic processor unit, the method comprising:
   detecting from a program code a code area that instructs a load/store unit to load data stored in a plurality of rows of a memory to at least one register of a register file using a scheduler; and
   loading, using the load/store unit, data to the at least one register of the register file in response to at least one instruction corresponding to the code area,
   wherein the at least one instruction comprises second and third instructions,
   wherein the second instruction instructs the load/store unit to write control information in a control register of the at least one register of the register file and the control information includes at least mask bits designating selected rows of the memory that store data to be loaded from the plurality of rows of the memory to the at least one register of the register file, a span field representing a relationship of the plurality of rows of the memory to each other and a stride field, and
   wherein the third instruction instructs the load/store unit to store the data sequentially from a row of the memory corresponding to an address written in a base register of the at least one register of the register file to a first register of the at least one register of the register file as a starting register, according to the control information.

2. The method of claim 1, wherein data stored in one row includes data associated with one pixel.

3. The method of claim 1, wherein a number of memory transactions between the memory and the register file is determined based on the control information.

4. The method of claim 1, wherein the at least one instruction further comprises a first instruction that instructs to write a base address designating a first row of the plurality of rows of the memory to the base register of the at least one register of the register file, and
   wherein the control information further includes a duplication field that represents a number of the mask bit with respect to data of one pixel.

5. The method of claim 4, wherein when the data stored in one row of the memory corresponds to RGBA data of the one pixel, the duplication field corresponds to four.

6. The method of claim 4, wherein the rows are divided into a plurality of groups, each of which has consecutive addresses indicated by the span field.

7. The method of claim 6, wherein the stride field determines an address gap between the groups.

8. The method of claim 4, wherein the third instruction further includes a format field that represents a format of the data to be loaded to the at least one register of the register file.

9. The method of claim 8, wherein, when the format field represents that the data to be loaded have a packed format, the data are packed and the packed data are stored in the at least one register of the register file according to the mask bit.

10. The method of claim 8, wherein, when the format field represents that the data to be loaded have an unpacked format, the data are stored in the at least one register of the register file according to the span field.

11. The method of claim 4, wherein the third instruction further includes at least one of an article, a number and a physical address of the starting register.

12. A graphic processor unit, comprising:
   an instruction memory storing compiled source code from a host as an instruction;
   a scheduler decoding an instruction from the instruction memory, the scheduler being connected to a thread pool that stores a plurality of threads temporarily;
   a load/store unit calculating a base address designating a first row of a plurality of rows of a memory based on a multiple load instruction, when the decoded instruction from the scheduler is the multiple load instruction that instructs at load/store unit to load data stored in the plurality of rows of the memory; and
   a register file including at least one register to which the data stored in the memory are loaded based on the base address,
   wherein the multiple load instruction comprises second and third instructions,
   wherein the second instruction instructs the load/store unit to write control information in a control register of the at least one register of the register file and the control information includes at least mask bits designating selected rows of the memory that store data to be loaded from the plurality of rows of the memory to the at least one register of the register file, a span field representing a relationship of the plurality of rows of the memory to each other and a stride field, and
   wherein the third instruction instructs the load/store unit to store the data sequentially from a row of the memory corresponding to an address written in a base register of the at least one register of the register file to a first register of the at least one register of the register file as a starting register, according to the control information.

13. The graphic processor unit of claim 12, wherein the multiple load instruction further comprises a first instruction that instructs the load/store unit to write the base address designating the first row of the plurality of rows of the memory to the base register of the at least one register of the register file, and
   wherein the control information further includes a duplication field that represents a number of the mask bit with respect to data of one pixel.

14. The graphic processor unit of claim 13, wherein the third instruction further includes a format field that represents a format of the data to be loaded to the at least one register of the register file, and, when the format filed represents that the data to be loaded has a packed format, the data are packed and the packed data are stored in the at least one register of the register file according to the mask bit.

15. The graphic processor unit of claim 13, wherein the third instruction further includes a format field that represents a format of the data to be loaded to the at least one register of the register file, and, when the format filed represents that the data to be loaded has a unpacked format, the data are stored in the at least one register of the register file according to the span field.

16. A graphic processor unit, comprising:
   a scheduler receiving and decoding a multiple load instruction;
   a load/store unit receiving the decoded multiple load instruction from the scheduler; and a register file comprising at least one register to which data stored in a memory are loaded based on a base address, wherein the multiple load instruction instructs the load/store unit to load data stored in a plurality of rows of the memory to the at least one register of the register file, wherein the multiple load instruction comprises first, second and third instructions, wherein the first instruction instructs the load/store unit to write the base address designating a first row of the plurality of rows of the system memory to a base register of the at least one register of the register file, wherein the second instruction instructs the load/store unit to write control information in a control register of the at least one register of the register file, the control information including at least mask bits designating selected rows of the memory that store data to be loaded from the plurality of rows of the memory to the at least one register of the register file, a span field representing a relationship of the plurality of rows of the memory to each other and a stride field, and wherein the third instruction instructs the load/store unit to store the data sequentially from a row of the memory corresponding to an address written in the base register of the at least one register of the register file to a first register of the at least one register of the register file as a starting register, according to the control information.

17. The graphic processor unit of claim 16 further comprising an instruction memory storing compiled source code from a host as an instruction, wherein the scheduler decodes a scheduler decodes an instruction from the instruction memory, and wherein the scheduler being connected to a thread pool that stores a plurality of threads temporarily.

18. The graphic processor unit of claim 16, wherein the control information further includes a duplication field that represents a number of the mask bit with respect to data of one pixel.

19. The graphic processor unit of claim 18, wherein the third instruction further includes a format field that represents a format of the data to be loaded to the at least one register of the register file, and, when the format filed represents that the data to be loaded has a packed format, the data are packed and the packed data are stored in the at least one register of the register file according to the mask bit.

20. The graphic processor unit of claim 18, wherein the third instruction further includes a format field that represents a format of the data to be loaded to the at least one register of the register file, and, when the format filed represents that the data to be loaded has a unpacked format, the data are stored in the at least one register of the register file according to the span field.

* * * * *